(12) United States Patent
Ramseyer et al.

(10) Patent No.: US 12,140,465 B2
(45) Date of Patent: Nov. 12, 2024

(54) CORIOLIS MEASURING SENSOR AND CORIOLIS MEASURING DEVICE

(71) Applicant: Endress+Hauser Flowtec AG, Reinach (CH)

(72) Inventors: Severin Ramseyer, Münchenstein (CH); Benjamin Schwenter, Breitenbach (CH); Johan Pohl, Freiburg (DE)

(73) Assignee: Endress+Hauser Flowtec AG, Reinach (CH)

( * ) Notice: Subject to any disclaimer, the term of this patent is extended or adjusted under 35 U.S.C. 154(b) by 341 days.

(21) Appl. No.: 17/638,913

(22) PCT Filed: Aug. 3, 2020

(86) PCT No.: PCT/EP2020/071815
§ 371 (c)(1),
(2) Date: Feb. 28, 2022

(87) PCT Pub. No.: WO2021/037490
PCT Pub. Date: Mar. 4, 2021

(65) Prior Publication Data
US 2022/0299355 A1     Sep. 22, 2022

(30) Foreign Application Priority Data
Aug. 30, 2019   (DE) .............. 10 2019 123 344.5

(51) Int. Cl.
*G01F 25/10*     (2022.01)
*G01F 1/84*      (2006.01)
*G01N 9/00*      (2006.01)

(52) U.S. Cl.
CPC ............ *G01F 25/10* (2022.01); *G01F 1/8427* (2013.01); *G01F 1/8477* (2013.01); *G01N 9/002* (2013.01); *G01N 2009/006* (2013.01)

(58) Field of Classification Search
CPC ...... G01F 25/10; G01F 1/8427; G01F 1/8477; G01F 1/84; G01F 1/845; G01N 9/002; G01N 2009/006
See application file for complete search history.

(56) References Cited

U.S. PATENT DOCUMENTS 4,063,448 A * 12/1977 Agar ................ G01N 9/002
                                           73/32 A
4,192,184 A    3/1980 Cox et al.
(Continued)

FOREIGN PATENT DOCUMENTS

| DE | 102015002893 A1 | 9/2016 |
|----|-----------------|--------|
| DE | 102015120087 A1 | 5/2017 |
| WO | 2019110353 A1   | 6/2019 |

*Primary Examiner* — Jennifer Bahls
*Assistant Examiner* — Quang X Nguyen
(74) *Attorney, Agent, or Firm* — Kelly J. Smith; Endress+Hauser (USA) Holding, Inc.

(57) ABSTRACT

The present disclosure relates to a Coriolis measuring sensor of a Coriolis measuring device for measuring a density or a mass flow of a medium flowing through a pipeline, including: at least one measuring tube for conducting a medium; a support body for supporting the at least one measuring tube; at least one vibration generator for generating measuring tube vibrations; at least two vibration sensors for sensing measuring tube vibrations, wherein the vibration sensors each have at least one permanent magnet and at least one sensor coil, and wherein the vibration generator in each case has at least one permanent magnet and at least one exciter coil, characterized in that the Coriolis measuring sensor includes an amplitude sensor designed to sense a vibration amplitude of the measuring tube vibrations.

12 Claims, 2 Drawing Sheets

(56) References Cited

U.S. PATENT DOCUMENTS

| | | | |
|---|---|---|---|
| 5,295,084 A | 3/1994 | Arunachalam et al. | |
| 5,488,870 A | 2/1996 | Yoshimura et al. | |
| 2007/0084298 A1* | 4/2007 | Rieder | G01F 1/8404 |
| | | | 73/861.356 |
| 2009/0064797 A1 | 3/2009 | Jouwsma et al. | |
| 2011/0247433 A1* | 10/2011 | Werbach | G01F 1/8413 |
| | | | 73/861.357 |
| 2019/0170552 A1* | 6/2019 | Dutton | G01F 15/024 |
| 2020/0064170 A1* | 2/2020 | Ricken | G01F 1/8413 |
| 2020/0109979 A1* | 4/2020 | Dasaka | G01F 1/8413 |
| 2020/0319007 A1* | 10/2020 | Zhu | G01F 25/10 |

\* cited by examiner

CORIOLIS MEASURING SENSOR AND CORIOLIS MEASURING DEVICE

CROSS-REFERENCE TO RELATED APPLICATIONS

The present application is related to and claims the priority benefit of German Patent Application No. 10 2019 123 344.5, filed on Aug. 30, 2019, and International Patent Application No. PCT/EP2020/071815, filed on Aug. 3, 2020, the entire contents of which are incorporated herein by reference.

TECHNICAL FIELD

The invention relates to a Coriolis measuring sensor for measuring a density or a mass flow of a medium flowing through a pipeline, and to a Coriolis measuring device having such a Coriolis measuring sensor.

BACKGROUND

Conventional Coriolis measuring sensors or Coriolis measuring devices are already known, as shown in DE102015120087A1, and usually comprise one or more measuring tubes which, during operation, are connected to a pipeline and conduct a medium flowing through the pipeline. Vibration generators set the measuring tubes vibrating, and vibration sensors sense the measuring tube vibrations, wherein, by using the Coriolis effect, conclusions can be drawn from the measuring tube vibrations regarding media properties, such as density or mass flow.

Vibration generators and vibration sensors usually comprise in each case at least one permanent magnet and in each case at least one coil, wherein measuring tube vibrations lead to a movement of the permanent magnets relative to associated coils. In the case of generators, the measuring tube vibrations are triggered by applying an excitation current to an exciter coil, wherein a magnetic field thereby generated triggers a force on the associated permanent magnet. Conversely, measuring tube vibrations lead to an induction of voltages, which are evaluated as measurement voltages.

The mutual interaction between a permanent magnet and an associated coil is strongly influenced by a state of the permanent magnet. Aging effects lead to the decay of an intrinsic magnetic field of the permanent magnet. If such effects are not taken into account or are not known, measured values of media properties can be distorted.

SUMMARY

The aim of the invention is therefore to propose a Coriolis measuring sensor and a Coriolis measuring device in which aging effects in permanent magnets can be recognized and compensated for.

The aim is achieved by a Coriolis measuring sensor and by a Coriolis measuring device according to the present disclosure.

A Coriolis measuring sensor according to the invention in a Coriolis measuring device for measuring a density or a mass flow of a medium flowing through a pipeline comprises:
at least one measuring tube for conducting the medium;
a support body for supporting the at least one measuring tube;
at least one vibration generator for generating measuring tube vibrations;
at least two vibration sensors for sensing measuring tube vibrations,
wherein the vibration sensors in each case have at least one permanent magnet and in each case at least one sensor coil,
and wherein the vibration generator in each case has at least one permanent magnet and in each case at least one exciter coil,
wherein the Coriolis measuring sensor has an amplitude sensor designed to sense a vibration amplitude of the measuring tube vibrations,
wherein the amplitude sensor has a first coil and a second coil which are magnetically coupled, and in particular aligned coaxially, with each other,
wherein the coils are configured to be moved relative to each other, in particular along their coil axes, by means of measuring tube vibrations,
wherein the first coil is designed to be supplied with a measurement current, in particular a direct current, and to generate a magnetic field,
wherein the second coil is configured to sense the magnetic field and to generate an induced measurement voltage.

In this way, an amplitude of the measuring tube can be measured without an aging-prone permanent magnet, and thus the vibration sensor and/or vibration generator can be calibrated during operation, or an age-related impairment of the vibration sensor or vibration generator can be compensated for during operation.

A direct current or an alternating current can here be applied to the first coil, wherein a frequency of such an alternating current should not match the vibration frequencies of the measuring tube or harmonics of the vibration frequencies, in order to prevent undesired, in particular mutual, influence.

Applying an alternating current to the first coil, in particular at a frequency greater than the vibration frequency of the measuring tube, can have advantages with regard to signal processing. However, an alternating electromagnetic field can also be undesirable on account of radiation. The person skilled in the art can take such aspects into account in his considerations and accordingly apply a measurement current to the first coil.

In one embodiment, the first coil has a fixed position with respect to the support body, and wherein the second coil is configured to follow the vibration movement of the measuring tube.

In this way, the coil supplied with a measurement current can be prevented from generating a non-static magnetic field component due to its own movement.

In one embodiment, the amplitude sensor is configured to sense the vibration amplitude of the measuring tube in a region with maximum amplitude.

In one embodiment, the first coil is a Helmholtz coil, wherein the second coil is designed in particular to be moved at least partially into the first coil by the measuring tube vibrations.

In one embodiment, a vibration amplitude of the measuring tube can be calculated by means of the measurement current as well as the induced measurement voltage.

The measurement voltage induced in the second coil enables a conclusion to be drawn about a measuring tube speed, and the measurement current is a measure of the strength of the magnetic field generated in the first coil. The vibration amplitude can be calculated with the aid of further variables, such as the inductances of the coils.

In one embodiment, the Coriolis measuring sensor has at least one measuring tube pair, wherein the measuring tubes of the measuring tube pair are configured to vibrate against each other, wherein the vibration generator has two exciter coils, which exciter coils are each arranged on a measuring tube of the measuring tube pair, wherein the permanent magnet of the vibration generator is arranged on a measuring tube, and/or wherein the vibration sensors each have two sensor coils, which sensor coils are in each case arranged on a measuring tube of the measuring tube pair, wherein the permanent magnet of the vibration generator is arranged on a measuring tube, wherein the exciter coils and/or the sensor coils of a respective vibration sensor in each case form a first coil and a second coil of the amplitude sensor.

A Coriolis measuring device according to the invention for measuring a density or a mass flow of a medium flowing through a pipeline comprises:

a Coriolis measuring sensor according to the invention,
an electronic measurement/operating circuit configured to operate the vibration generator and the amplitude sensor, and also configured to provide measured values of the density and/or mass flow on the basis of measuring tube vibrations sensed by the vibration sensors,
an electronics housing in which the electronic measuring/operating circuit is arranged,
wherein, by means of the amplitude sensor and at least one vibration sensor, the electronic measuring/operating circuit is configured to determine and in particular to compensate for an aging of the permanent magnet of the vibration sensor, and/or
to determine and in particular to compensate for an aging of the permanent magnet of the vibration generator by means of the amplitude sensor and at least one vibration generator.

In one embodiment, the electronic measuring/operating circuit is configured to determine the vibration amplitude of the measuring tube by means of the measurement current and the measurement voltage.

In one embodiment, the electronic measuring/operating circuit is configured to compensate for the aging of the permanent magnet of the vibration sensor by means of at least the following measured variables:
measured vibration amplitude of the measuring tube during calibration;
induced voltage in the sensor coil during calibration;
measured vibration amplitude of the measuring tube at a current point in time;
induced voltage in the sensor coil at a current point in time, and/or
wherein the electronic measuring/operating circuit is configured to compensate for the aging of the permanent magnet of the vibration generator by means of at least the following measured variables:
measured vibration amplitude of the measuring tube during calibration;
induced voltage in the exciter coil during calibration;
measured vibration amplitude of the measuring tube at a current point in time;
induced voltage in the exciter coil at a current point in time.

In a method according to the invention for compensating for an aging of a vibration generator/vibration sensor of a Coriolis measuring device according to the invention, at least one amplitude sensor determines a vibration amplitude of at least one measuring tube, wherein the amplitude sensor has a first coil and a second coil which are magnetically coupled, and in particular coaxially aligned, with each other, wherein the coils are designed to be moved relative to each other, especially along their coil axes, by measuring tube vibrations, wherein the first coil is configured to be supplied with a measurement current, in particular a direct current, and to generate a magnetic field, wherein the second coil is configured to sense the magnetic field and to generate an induced measurement voltage, wherein the method comprises the following steps:
measuring the vibration amplitude of the measuring tube during calibration by means of an amplitude sensor by means of the measurement current and the measurement voltage;
measuring an induced voltage in an exciter coil/sensor coil during calibration;
measuring the vibration amplitude of the measuring tube at a current point in time by means of an amplitude sensor by means of the measurement current and the measurement voltage;
measuring an induced voltage in an exciter coil/sensor coil at a current point in time;
determining an aging status of a permanent magnet of a vibration generator/vibration sensor at least by means of the measured variables sensed during the preceding method steps.

BRIEF DESCRIPTION OF THE DRAWINGS

In the following, the invention is described on the basis of the exemplary embodiments shown in the drawings. The following are shown:

FIG. 2 b) shows a schematic diagram of an exemplary embodiment of an amplitude sensor arrangement on two measuring tubes.

DETAILED DESCRIPTION

Figure 1:
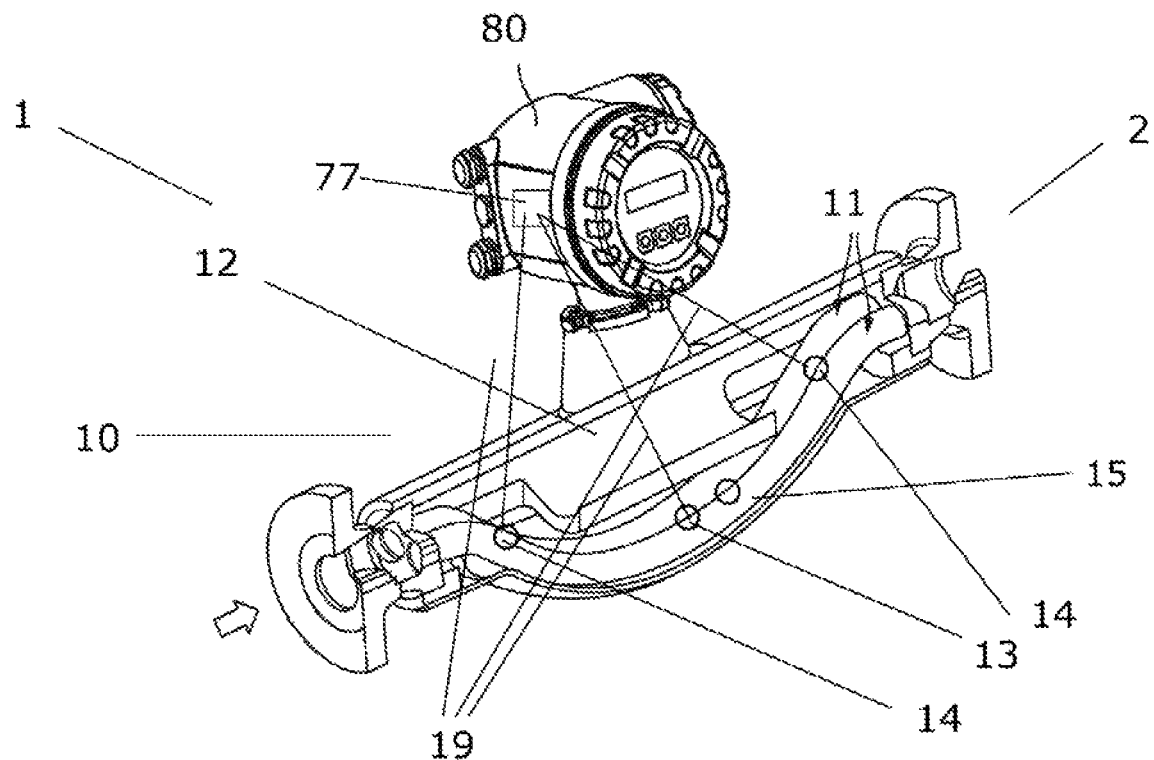
FIG. 1 shows an exemplary Coriolis measuring device according to the present disclosure.

FIG. 1 illustrates the structure of an exemplary Coriolis measuring device 1 according to the invention with an exemplary Coriolis measuring sensor 10 according to the present disclosure, wherein the Coriolis measuring sensor 10 has a vibratory system with two measuring tubes 11 each having an inlet and an outlet, a support body 12 for supporting the measuring tubes, a vibration generator 13, two vibration sensors 14, and an amplitude sensor 15 according to the invention. The generator is designed to excite the two measurement tubes to vibrate perpendicularly to a longitudinal measurement-tube plane defined in each case by the arch-shaped measurement tubes. The sensors are designed to sense the vibration imposed upon the measurement tubes. Temperature sensors (not shown) are configured to sense temperatures of the support body, of the measuring tubes (influenced by a medium temperature), and of the support body. The sensors and the generator can also be equipped with such temperature sensors. The Coriolis measuring sensor 10 is connected to an electronics housing 80 of the Coriolis measuring device 1, which is designed to house an electronic measuring/operating circuit 77, which measuring/operating circuit is designed to operate the vibration generator and also the vibration sensors and the amplitude sensor 15, and, on the basis of vibration properties of the measurement tube as measured by means of the sensors, to determine and provide flow-rate measured values and/or density measured values. The generator and the sensor elements are connected to the electronic measuring/operating circuit by means of electrical connections 19. The electrical connections 19 can in each case be grouped together by cable guides.

Some effects must be taken into account when operating such a Coriolis measuring device. Generator efficiency thus influences a vibration amplitude of the measurement tube, and a sensitivity of the sensors influences an ability to convert a vibration of the measurement tube into a measured variable, such as a measurement voltage or a measurement current. A Coriolis measuring device is frequently calibrated under standard conditions before start-up by, for example, a customer of a manufacturer of Coriolis measuring devices, and, among other things, a relationship between an excitation of measuring tube vibrations by the generator and a detection of the measuring tube vibrations by the sensors is thus documented. Generator efficiency as well as sensor sensitivity are here subject to influences which, for one, can cause reversible changes, but also irreversible changes, in these variables.

An example of a reversible influence is an increase in an ohmic resistance of a coil device of a sensor caused by an increase in the temperature of the coil device, which results in a reduced induction of a voltage by a sensor magnet moved relative to the coil device. An example of an irreversible change is an aging of the sensor magnet due, for example, to severe heating.

The amplitude sensor 15 with a first coil 15.1 and a second coil 15.2 (see FIG. 2) is configured to measure the vibration amplitude of the measuring tube, wherein the first coil is configured to be subjected to a measurement current, in particular a direct current, and to generate a magnetic field, wherein the second coil is configured to sense the magnetic field and to generate an induced measurement voltage.

By arranging the coils in such a way that the coils are moved relative to each other by the measuring tube vibrations, a vibration amplitude can be calculated by means of the measurement current and the measurement voltage and a vibration frequency of the measuring tubes.

In the Coriolis measuring device shown here, the first coil and the second coil can each be arranged on a measuring tube so that they are aligned with each other, in particular coaxially, for the purpose of good magnetic coupling and are moved relative to each other, in particular along their coil axes 15.3, by measuring tube vibrations.

Alternatively, just one of the coils can also be attached to a measuring tube, and the other coil affixed to the support body, wherein, in this case as well, they are aligned, in particular coaxially, with each other and, due to measuring tube vibrations, are moved relative to each other, in particular along their coil axes 15.3.

The electronic measuring/operating circuit 77 is configured to compensate for the aging of the permanent magnet 14.1 of the vibration sensor by means of at least the following measured variables:
  measured vibration amplitude of the measuring tube during calibration;
  induced voltage in the sensor coil during calibration;
  measured vibration amplitude of the measuring tube at a current point in time;
  induced voltage in the sensor coil at a current point in time, and/or wherein the electronic measuring/operating circuit 77 is configured to compensate for the aging of the permanent magnet 13.1 of the vibration generator 13 by means of at least the following measured variables:
  measured vibration amplitude of the measuring tube 11 during calibration;
  induced voltage in the exciter coil during calibration;
  measured vibration amplitude of the measuring tube at a current point in time;
  induced voltage in the exciter coil at a current point in time.

In this way, an amplitude of the measuring tube can be measured without an aging-prone permanent magnet, and thus the vibration sensor and/or vibration generator can be calibrated during operation, or an age-related impairment of the vibration sensor or vibration generator can be compensated for during operation.

A direct current or an alternating current can here be applied to the first coil, wherein a frequency of such an alternating current should not match the vibration frequencies of the measuring tube or harmonics of the vibration frequencies, in order to prevent undesired, in particular mutual, influence.

Applying an alternating current to the first coil, in particular at a frequency greater than the vibration frequency of the measuring tube, can have advantages with regard to signal processing. However, an alternating electromagnetic field can also be undesirable on account of radiation. The person skilled in the art can take such aspects into account in his considerations and accordingly apply a measurement current to the first coil.

A Coriolis measuring device according to the invention is not limited to the presence of two measurement tubes. The invention can be thus implemented in a Coriolis measuring device having any number of measuring tubes, e.g., even in a single-tube or four-tube measuring device.

Contrary to what is shown here, the measuring tubes can also be straight and, for example, configured to perform lateral or torsional vibrations.

Figure 2:
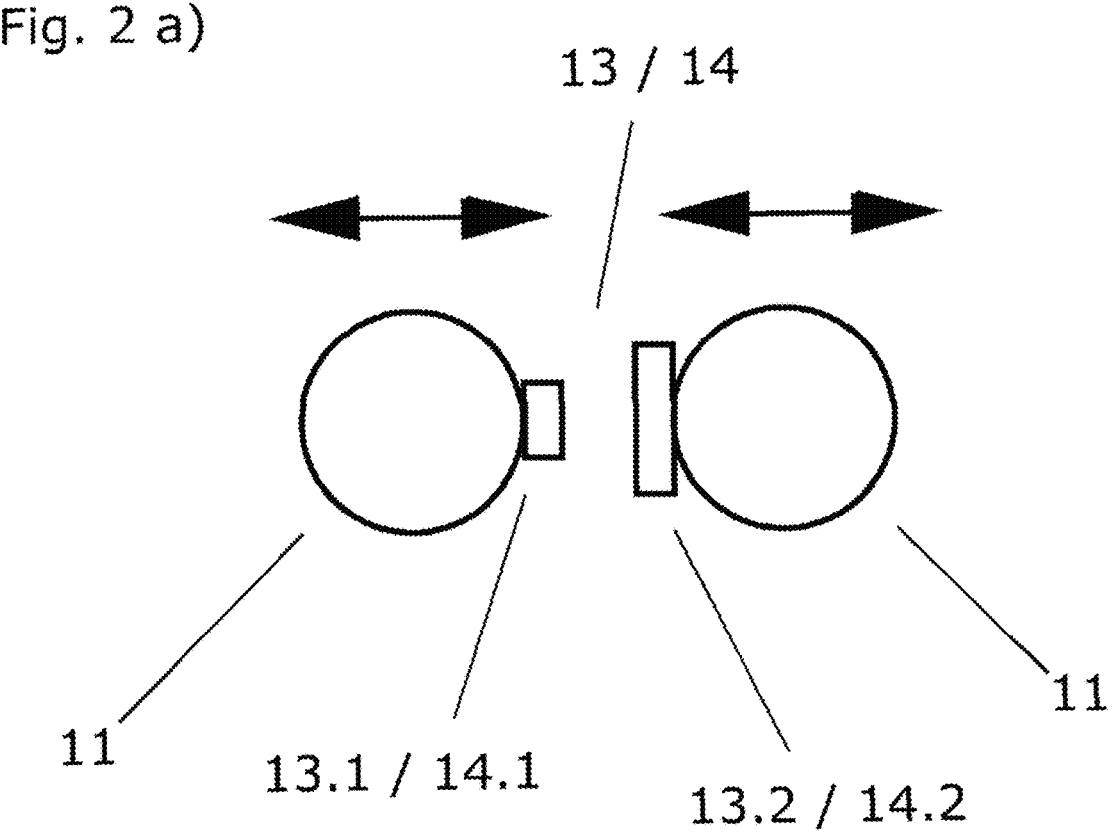
FIG. 2 a) shows a schematic diagram of an exemplary embodiment of a vibration generator or of a vibration sensor arrangement on two measuring tubes.
Figure 2:
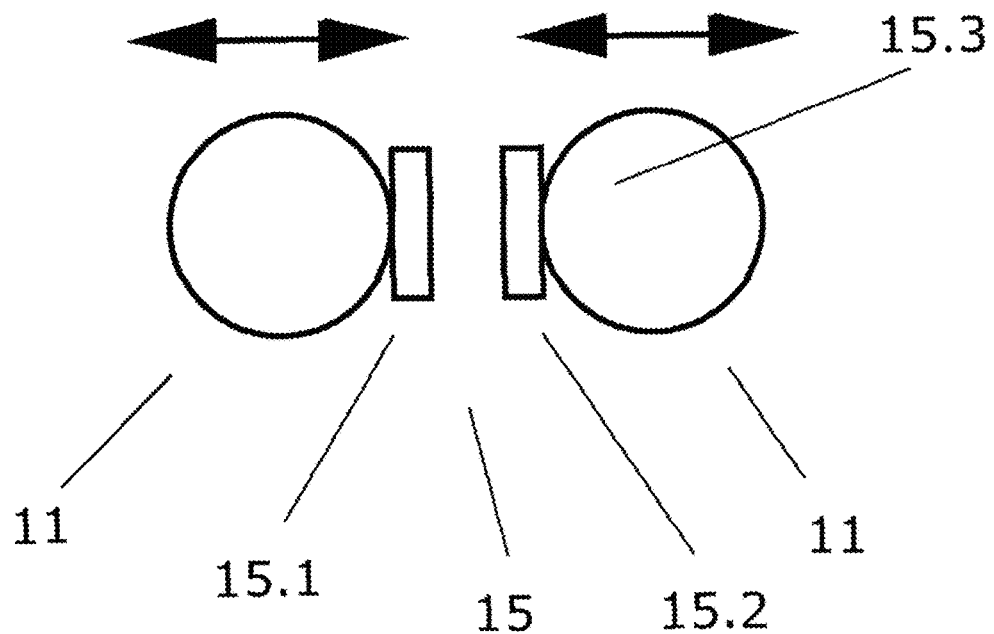

FIG. 2 *a*) shows an exemplary schematic arrangement of a vibration generator 13 or vibration sensor 14 on two measuring tubes of a Coriolis measuring sensor, wherein a permanent magnet 13.1, 14.1 is arranged on one measuring tube, and a sensor coil 14.2 or exciter coil 13.2 is arranged on the other measuring tube in each case. The measuring tubes are here configured to vibrate against each other, wherein, in the case of a vibration sensor, an induction of a voltage in the coil takes place due to the relative movement between the permanent magnet and the sensor coil, which can be used as a measurement voltage for determining medium properties. In the case of a vibration generator, an electric current can be applied to the exciter coil to exert a force on the corresponding permanent magnet in order to generate a measuring tube vibration. The efficiency of generating a measuring tube vibration or of its detection by means of the induction of a voltage in the sensor coil depends, among other things, upon the aging states of the permanent magnets.

In order to be able to sense these aging states, an amplitude sensor according to the invention is configured with a first coil 15.1 and a second coil 15.2 (see FIG. 2*b*)), in which, as shown here, one coil in each case can be arranged on a measuring tube. By applying a measurement current, in particular a direct current, to the first coil in order to generate a magnetic field, and, by sensing the magnetic field with the second coil, a measurement tube vibration amplitude can be determined.

In order to compensate for aging effects in the vibration sensor, the following measured variables can be taken into account:
- measured vibration amplitude of the measuring tube during calibration;
- induced voltage in the sensor coil during calibration;
- measured vibration amplitude of the measuring tube at a current point in time;
- induced voltage in the sensor coil at a current point in time.

In order to compensate for aging effects in the vibration generator, the following measured variables can be taken into account:
- measured vibration amplitude of the measuring tube during calibration;
- induced voltage in the exciter coil during calibration;
- measured vibration amplitude of the measuring tube at a current point in time;
- induced voltage in the exciter coil at a current point in time.

In order to deduce a vibration amplitude at the location of the amplitude sensor from a vibration amplitude at the location of a vibration generator or vibration sensor, other measured variables can be taken into account for compensation, such as medium pressure, medium temperature, medium density, measuring tube rigidity.

LIST OF REFERENCE SIGNS

1 Coriolis measuring device
10 Coriolis measuring sensor
11 Measuring tube
12 Support body
13 Vibration generator
13.1 Permanent magnet
13.2 Exciter coil
14 Vibration sensors
14.1 Permanent magnet
14.2 Sensor coil
15 Amplitude sensor
15.1 First coil
15.2 Second coil
15.3 Coil axis
77 Electronic measuring/operating circuit
80 Electronics housing

The invention claimed is:

1. A Coriolis measuring sensor of a Coriolis measuring device configured to measure a density or a mass flow of a medium flowing through a pipeline, the measuring sensor comprising:
at least one measuring tube configured to conduct the medium;
a support body configured to support the at least one measuring tube;
a vibration generator configured to generate measuring tube vibrations in the at least one measuring tube, wherein the vibration generator includes at least one permanent magnet and at least one exciter coil;
at least two vibration sensors configured to sense the measuring tube vibrations, wherein the vibration sensors each include at least one permanent magnet and at least one sensor coil; and
an amplitude sensor configured to sense a vibration amplitude of the measuring tube vibrations, wherein the amplitude sensor includes a first coil and a second coil that are magnetically coupled and are coaxially aligned with each other,
wherein the first coil and the second coil are configured to translate relative to each other along respective coil axes due to the measuring tube vibrations,
wherein the first coil is adapted to be supplied with a measurement current and to generate a magnetic field, and
wherein the second coil is configured to sense the magnetic field and to generate an induced measurement voltage.

2. The measuring sensor of claim 1, wherein the first coil is adapted such that the measurement current is a direct current.

3. The measuring sensor of claim 1, wherein the first coil has a fixed position with respect to the support body, and wherein the second coil is configured to follow movements of the at least one measuring tube.

4. The measuring sensor of claim 1, wherein the amplitude sensor is configured to sense the vibration amplitude of the at least one measuring tube in a region of maximum amplitude.

5. The measuring sensor of claim 1, wherein the first coil is a Helmholtz coil, wherein the second coil is configured to be at least partially moved toward the first coil by the measuring tube vibrations.

6. The measuring sensor of claim 1, wherein the amplitude sensor is configured such that the vibration amplitude of the at least one measuring tube can be calculated based on the measurement current and the induced measurement voltage.

7. A Coriolis measuring device for measuring a density or a mass flow of a medium flowing through a pipeline, the measuring device comprising:
a Coriolis measuring sensor according to claim 1;
an electronic measuring/operating circuit configured to operate the vibration generator and the amplitude sensor and configured to generate measured values of the density and/or the mass flow based on the measuring tube vibrations sensed by the vibration sensors; and
an electronics housing in which the electronic measuring/operating circuit is disposed,
wherein the electronic measuring/operating circuit is configured to determine and compensate for an aging of the permanent magnet of the vibration sensor using the amplitude sensor and the vibration sensor and/or using the amplitude sensor and the vibration generator.

8. The measuring device of claim 7, wherein the electronic measuring/operating circuit is configured to determine the vibration amplitude of the at least one measuring tube from the measurement current and the measurement voltage.

9. The measuring device of claim 8, wherein:
the electronic measuring/operating circuit is configured to compensate for the aging of the permanent magnet of the vibration sensor using at least the following measured variables:
measured vibration amplitude of the at least one measuring tube during calibration;
induced voltage in the sensor coil during calibration;
measured vibration amplitude of the at least one measuring tube at a current point in time; and
induced voltage in the sensor coil at a current point in time; and/or
the electronic measuring/operating circuit is configured to compensate for the aging of the permanent magnet of the vibration generator using at least the following measured variables:

measured vibration amplitude of the at least one measuring tube during calibration;
induced voltage in the exciter coil during calibration;
measured vibration amplitude of the at least one measuring tube at a current point in time; and
induced voltage in the exciter coil at a current point in time.

10. The measuring device of claim 7, wherein:
the electronic measuring/operating circuit is configured to compensate for the aging of the permanent magnet of the vibration sensor using at least the following measured variables:
measured vibration amplitude of the at least one measuring tube during calibration;
induced voltage in the sensor coil during calibration;
measured vibration amplitude of the at least one measuring tube at a current point in time; and
induced voltage in the sensor coil at a current point in time; and/or
the electronic measuring/operating circuit is configured to compensate for the aging of the permanent magnet of the vibration generator using at least the following measured variables:
measured vibration amplitude of the at least one measuring tube during calibration;
induced voltage in the exciter coil during calibration;
measured vibration amplitude of the at least one measuring tube at a current point in time; and
induced voltage in the exciter coil at a current point in time.

11. A method for compensating for an aging of a vibration generator and/or a vibration sensor of a Coriolis measuring device, the method comprising:
providing the Coriolis measuring device according to claim 7, wherein the amplitude sensor determines a vibration amplitude of the at least one measuring tube, wherein the amplitude sensor has the first coil and the second coil, which are magnetically coupled and are aligned coaxially with each other, wherein the first and second coils are configured to move relative to each other along their respective coil axes due to the measuring tube vibrations, and
wherein the first coil is configured to be supplied with a measurement current and to generate a magnetic field, wherein the second coil is configured to sense the magnetic field and to generate an induced measurement voltage;
measuring the vibration amplitude of the at least one measuring tube during calibration using the amplitude sensor based on the measurement current and the measurement voltage;
measuring an induced voltage in the exciter coil and/or the sensor coil during calibration;
measuring the vibration amplitude of the at least one measuring tube at a current point in time using an amplitude sensor based on the measurement current and the measurement voltage;
measuring an induced voltage in the exciter coil and/or the sensor coil at a current point in time; and
determining an aging state of the permanent magnet of the vibration generator and/or the vibration sensor at least based on the measured variables sensed during the preceding method steps.

12. The method of claim 11, wherein the first coil is adapted such that the measurement current is a direct current.

* * * * *